United States Patent [19]

Foeldesi

[11] Patent Number: 4,541,645
[45] Date of Patent: Sep. 17, 1985

[54] VEHICLE RADIATOR MOUNTING

[75] Inventor: Mihaly Foeldesi, Plochingen, Fed. Rep. of Germany

[73] Assignee: Daimler-Benz Aktiengesellschaft, Stuttgart, Fed. Rep. of Germany

[21] Appl. No.: 558,300

[22] Filed: Dec. 5, 1983

[30] Foreign Application Priority Data

Dec. 16, 1982 [DE] Fed. Rep. of Germany ....... 3246583

[51] Int. Cl.⁴ .............................................. B60K 11/04
[52] U.S. Cl. ................................... 180/68.4; 180/232
[58] Field of Search ..................... 180/68.4, 232, 68.6; 296/84 H; 49/381, 394; 165/67; 248/232, 233; 403/397

[56] References Cited

U.S. PATENT DOCUMENTS

| 1,623,473 | 4/1927 | Gurney | 180/68.4 |
| 1,648,804 | 11/1927 | Griese | |
| 3,792,889 | 2/1974 | Fuener | 296/189 |
| 3,834,478 | 9/1974 | Alexander et al. | |
| 3,929,201 | 12/1975 | Hoffman | 180/68.4 |
| 4,240,403 | 12/1980 | Bader | 49/394 |

FOREIGN PATENT DOCUMENTS

| 0046566 | 3/1982 | European Pat. Off. | |
| 1188456 | 3/1965 | Fed. Rep. of Germany | |
| 7624455 | 11/1976 | Fed. Rep. of Germany | |
| 2722926 | 11/1978 | Fed. Rep. of Germany | |
| 1228929 | 9/1960 | France | 248/232 |
| 2336268 | 7/1977 | France | |
| 914325 | 1/1963 | United Kingdom | |

Primary Examiner—Joseph F. Peters, Jr.
Assistant Examiner—Everett G. Diederiks, Jr.
Attorney, Agent, or Firm—Barnes & Thornburg

[57] ABSTRACT

The invention relates to the mounting of a radiator on the bodywork of a motor vehicle, in a manner such that, in its upper region, the radiator is suspended in a manner permitting pivoting about a transverse axis of the vehicle, while the lower region is held by means of a retaining clip. In the event of a frontal blow in the radiator, the fixing involving the retaining clip releases, and the radiator swings out, towards the rear.

3 Claims, 2 Drawing Figures

VEHICLE RADIATOR MOUNTING

The invention relates to a mounting for the radiator of a motor vehicle wherein the radiator is supported on the body work of the motor vehicle in a manner permitting pivoting about a horizontal axis which is located transversely with respect to the direction of vehicle motion and in the upper region of the radiator.

In the case of a mounting of this type, as disclosed in German Examined Published Application (Auslegeschrift) No. 1,188,456, the radiator is retained by means of two supporting arms which are located at the sides and extend obliquely downwards in the direction of vehicle motion when the radiator is in its installed position. The lower ends of the arms are fastened to the vehicle chassis in a manner permitting articulation, and the upper ends are similarly fastened to the upper portion of the radiator. In order to define the installed position, the radiator is provided on its bottom with conical spot-indentations which engage over rubber bearings on the vehicle chassis. This mounting facilitates the fitting or, as the case may be, the removal of a radiator, but it does not permit the lower end of the radiator to swing away towards the rear when it receives a blow, as can occur, for example, in the event of an accident. In the case of a mounting for radiators, known from German Utility Model No. 7,624,455, too, this rearward swinging movement is impossible, because this mounting, which is designed for quick fitting, or, as the case may be, removal, incorporates pegs which project downward from the lower end of the radiator, and engage into rubber rings which are held by means of a beam.

In contrast to the above-mentioned arrangements, the invention sets out to design the mounting in a manner such that, without adversely effecting the ease of fitting or, as the case may be, removal, the radiator can, in the event of receiving a blow in its lower region, for example in the event of a collision, swing out, about an upper pivot axis, towards the rear.

The above-mentioned object is achieved in accordance with the invention by means of a mounting arrangment wherein the radiator is provided with bearing journals on its upper water box, on both sides, in order to enable it to be suspension-fitted into rubber bearings which are fixed to the bodywork, and a cylindrical rubber block, or a retaining pin, is centrally arranged on its lower water box. This block engages into a resilient retaining clip which is fixed to the bodywork and is open towards the rear.

In an advantageous manner, the invention enables the radiator to be suspension-fitted, during assembly, into the rubber bearings in a slightly inclined position by means of its bearing journals in the manner of a hinge, after which operation it can be inserted by the rubber block on its lower water box by means of a pivoting movement into the retaining clip. In the case of removal, the rubber block on the radiator is detached from the retaining clip, after which the radiator is unhinged from the rubber bearings. In the event of an impact on the vehicle, or of a direct blow on the radiator, the latter becomes detached from the retaining clip and swings away, towards the rear, thus preventing the delicate radiator finning from being damaged.

The operation of suspension-fitting the radiator or, as the case may be, of unhinging it, is rendered still easier, in an advantageous manner in accordance with a further feature of the invention, wherein the two bearing journals are arranged in a manner such that they point in the same direction.

In an advantageous embodiment of the mounting, the cylindrical rubber block or the retaining pin, on the lower water box, can be provided with flanges on both sides, their spacing corresponding to the width of the retaining clip, thus effecting the fixing of the radiator with respect to lateral movements.

In addition, the fastening of the retaining clip to the bodywork, can incorporate an interposed rubber block. This arrangement is to be recommended when a retaining pin is provided on the lower water box instead of a cylindrical rubber block.

Further objects, features, and advantages of the present invention will become more apparent from the following description when taken in connection with the accompanying drawings which show, for purposes of illustration only, an embodiment in accordance with the present invention.

DETAILED DESCRIPTION OF THE DRAWINGS

Figure 1:
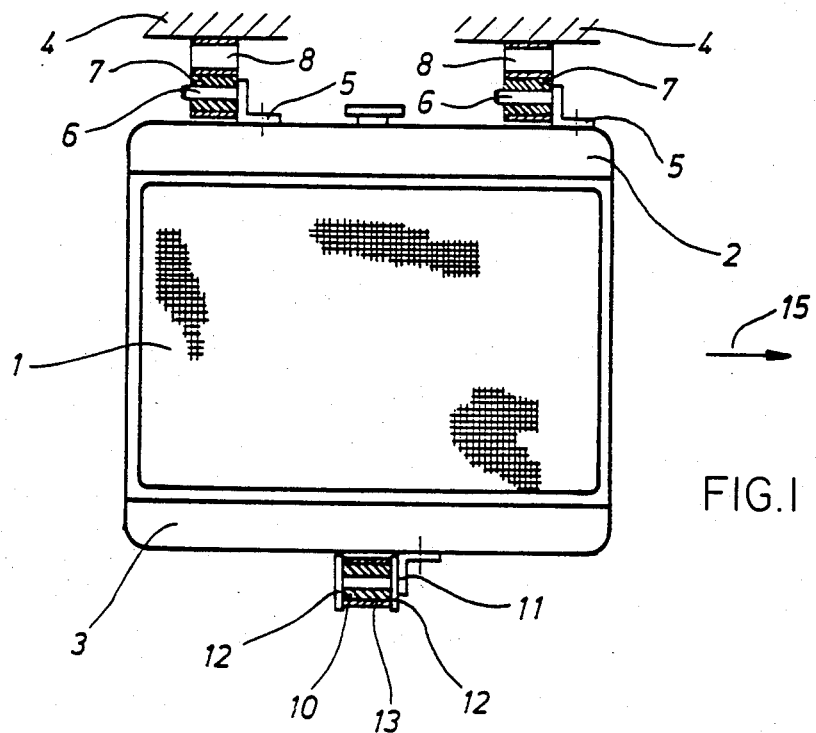
FIG. 1 is a schematic, part sectional view of a radiator for a motor vehicle seen from the front constructed according to a preferred embodiment of the invention.

As shown in FIG. 1, radiator 1 is provided with an upper water box 2, and a lower water box 3, as well as with bearing journals 6 on its upper water box 2, fastened by means of angle-plates 5. These bearing journals 6 are provided to be pointing in the same direction (leftward in FIG. 1) for the purpose of accomodating mounting the radiator on an upper, fixed portion 4 of the vehicle bodywork, and enabling the radiator 1 to be suspension-fitted into rubber bearings 7, in the manner of a hinge. The rubber bearings 7 are securely held on the portion 4 of the bodywork by means of retaining plates 8.

Figure 2:
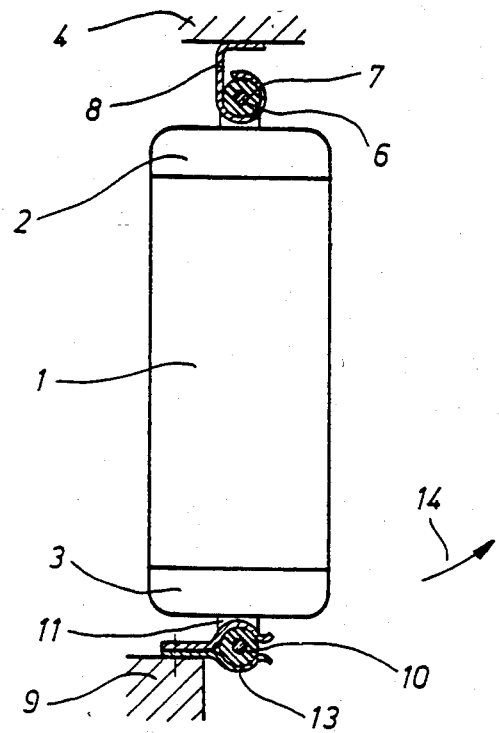
FIG. 2 shows the radiator according to FIG. 1 seen from the side.

A cylindrical rubber block 10 is, as shown in FIGS. 1 and 2, provided on the lower water box 3 of the radiator 1, in order to retain the radiator 1 on a lower, fixed portion 9 of the bodywork, this rubber block 10 possessing lateral guide flanges 12 and being held by means of an angle-plate 11. A resilient retaining clip 13, which is fastened to the portion 9 of the bodywork and is open towards the rear, extends over the rubber block 10 and, in consequence, securely retains the radiator 1 at the bottom. In order to prevent lateral movements of the radiator, the width of the retaining clip 13 corresponds to that of the rubber block 10 between the flanges 12.

In the event of a blow on the radiator 1, the rubber block 10 becomes detached from the retaining clip 13 and swings out, about the bearing journals 6, in the arrow-direction 14 indicated in FIG. 2. The radiator can easily be restored to its starting position, simply by pressing the rubber block 10 into the retaining clip 13, in the direction opposite to the arrow-direction 14 (FIG. 2).

In order to remove the radiator from the bodywork, it is pivoted and moved in the arrow-direction 15 (FIG. 1). Fitting of the radiator proceeds in the reverse sequence.

In the illustrative preferred embodiment, the bearing journals 6 are located on the upper water box 2. They can also be located in front of the water box, or behind it, according to other contemplated embodiments. The rubber block 10 can be located in front of the lower water box 3. Embodiments are also contemplated with the bearing journals 6 arranged in a manner such that one points towards the left, and the other towards the right. In this case, the retaining plates 8 are expediently fixed to the bodywork by means of detachable bolts. If, instead of the cylindrical rubber block 10, merely a retaining pin is installed on the lower water box, the fastening of the retaining clip 13, to the bodywork can advantageously incorporate an interposed rubber block.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Mounting arrangement for mounting a radiator to the bodywork of a motor vehicle comprising:
   bearing journal means at an upper water box region of the radiator, said bearing journal means extending horizontally to accomodate pivoting movement of the radiator about a horizontal axis through the bearing journal means;
   lower bearing means fixed to a lower water box region of the radiator; and
   resilient retaining means interposed between the bodywork and the lower bearing means to hold the lower portion of the radiator in a normal, in-use position, said resilient retaining means being configured to automatically release the lower bearing means and permit pivoting rearward movement of the lower part of the radiator about the horizontal axis through the bearing journal means in the event of a vehicle collision,
   wherein the lower bearing means includes lateral guide flanges which are spaced from one another to accomodate and guide the resilient retaining means.

2. Mounting arrangement for mounting a radiator to the bodywork of a motor vehicle comprising:
   bearing journal means at an upper water box region of the radiator, said bearing journal means extending horizontally to accomodate pivoting movement of the radiator about a horizontal axis through the bearing journal means;
   lower bearing means fixed to a lower water box region of the radiator; and
   resilient retaining means interposed between the bodywork and the lower bearing means to hold the lower portion of the radiator in a normal, in-use position, said resilient retaining means being configured to automatically release the lower bearing means and permit pivoting rearward movement of the lower part of the radiator about the horizontal axis through the bearing journal means in the event of a vehicle collision,
   wherein the lower bearing means is one of a cylindrical rubber block and a retaining pin bordered on opposite lateral sides by lateral flanges, and wherein the resilient retaining means is formed as a spring clip engaging over one of the cylindrical rubber block and retaining pin and open in the rearward direction of the vehicle.

3. Mounting arrangement for mounting a radiator to the bodywork of a motor vehicle comprising:
   bearing journal means at an upper water box region of the radiator, said bearing journal means extending horizontally to accomodate pivoting movement of the radiator about a horizontal axis through the bearing journal means;
   lower bearing means fixed to a lower water box region of the radiator;
   resilient retaining means interposed between the bodywork and the lower bearing means to hold the lower portion of the radiator in a normal, in-use position, said resilient retaining means being configured to automatically release the lower bearing means and permit pivoting rearward movement of the lower part of the radiator about the horizontal axis through the bearing journal means in the event of a vehicle collision; and
   elastic material bearing means carried by the vehicle body means and disposed in the bearing journal means,
   wherein the lower bearing means includes lateral guide flanges which are spaced from one another to accomodate and guide the resilient retaining means.

* * * * *